Patented Sept. 28, 1926.

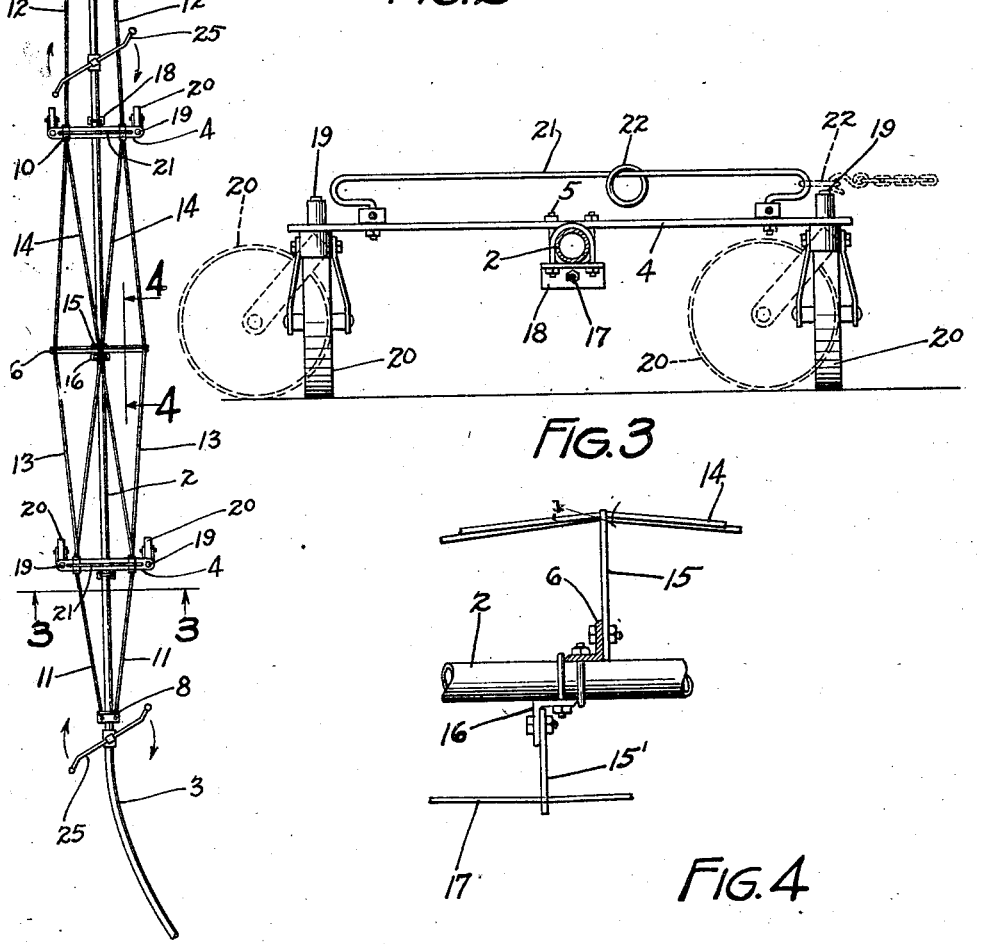

1,601,199

UNITED STATES PATENT OFFICE.

JOHN S. CLAPPER, OF MINNEAPOLIS, MINNESOTA.

SPRINKLING APPARATUS.

Application filed October 18, 1923. Serial No. 669,328.

My invention relates to a sprinkling apparatus capable of general use on the lawns of large estates or where a large area is to be sprinkled, but designed particularly for sprinkling the fairways of golf courses where it is desired to have a good stand of grass and soft, springy turf from which to play a ball.

A further object is to provide an apparatus which can be easily moved from place to place on the fairway and when in operation will easily sprinkle the full width of ordinary fairways.

A further object is to provide a sprinkling apparatus adapted particularly for golf courses and capable of being easily and quickly moved from one place to another, by the employment of comparatively light power, such as a small tractor.

A further object is to provide a sprinkling apparatus in which the units of the sections can be arranged in alignment with one another to extend directly across the fairways or be placed at any desired angle with respect to each other.

A further object is to provide a sprinkling apparatus in which a sprinkling head of ordinary type can be easily mounted.

Other objects of the invention will appear from the following detailed description.

The invention consists generally in the constructions and combinations hereinafter described, and more particularly pointed out in the claims.

In the drawings forming part of this specification,

Figure 2 is a plan view of the same;
Figure 3 is a sectional view on the line 3—3 of Figure 2;

Figure 4 is a section on the line 4—4 of Figure 2.

Figure 1:
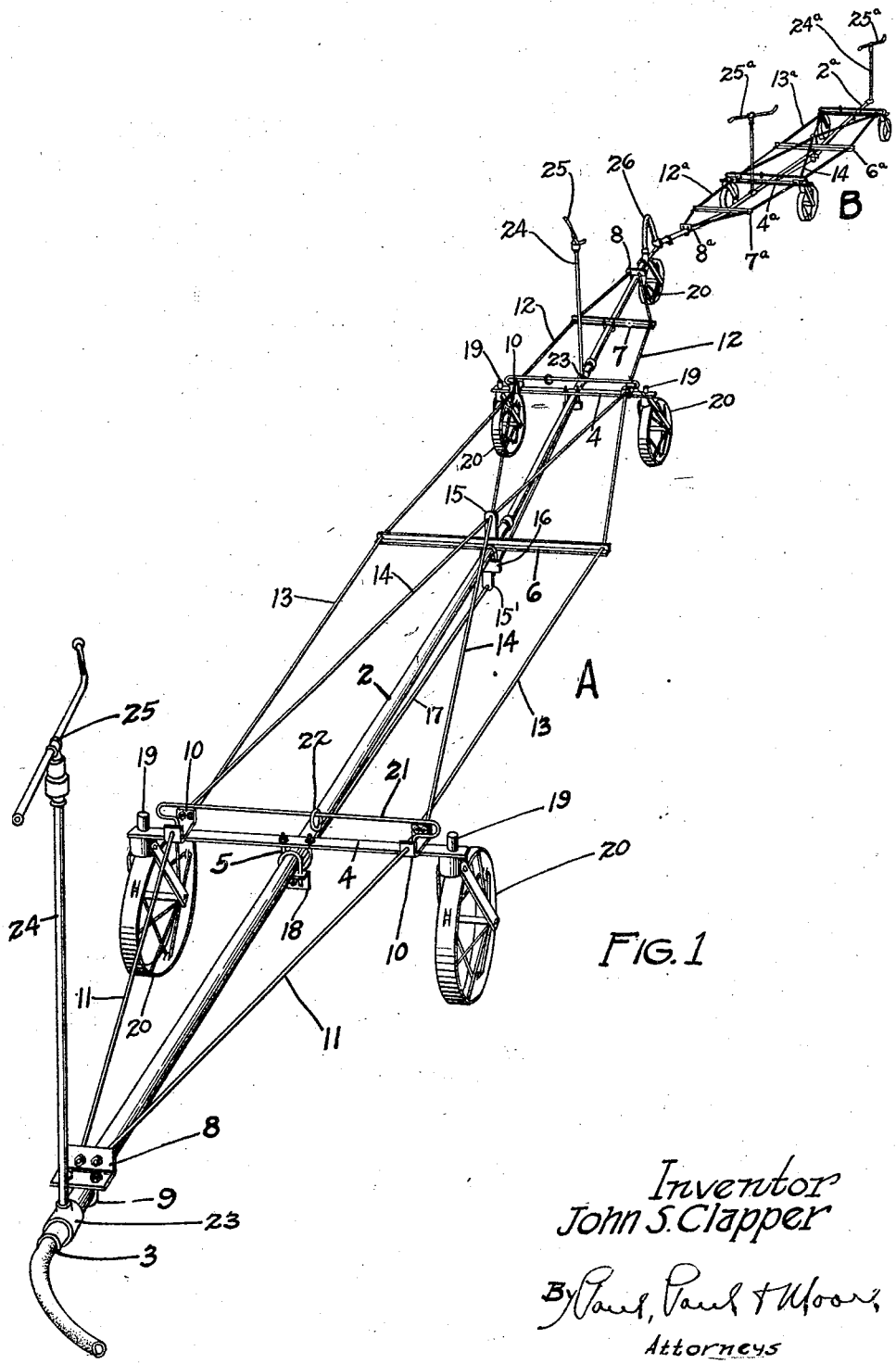
Figure 1 is a perspective view of a sprinkling apparatus embodying my invention.

In the drawing A and B represent two units of a sprinkling section. These units are alike in size and construction and a detailed description of one will suffice for both, similar reference numerals being used on the unit B with the addition of the exponent "a".

Referring to Figure 1, unit A, 2 represents a section or link of pipe of suitable size for attachment at 3 to a hydrant or other connection of the water system. Cross bars 4 are provided near the opposite ends of said pipe sections having their middle portions secured to the pipe by suitable means such as U-shaped clamps 5. A similar bar 6 is mounted in a corresponding manner on the middle portion of the pipe section. A shorter bar 7 is provided near one end and angle plates 8 are secured by U-shaped bolts 9 to the end portions of the pipe section. Brackets 10 are mounted transversely of the cross bars 4 near the outer ends thereof. Rods 11 are connected at one end of the brackets 10 and at their opposite ends to a flange of the plate 8, and similar rods 12 are connected to the cross bars and plate at the other end of the section and plate through the upper bar 7. Truss rods 13 connect the brackets 10 on the opposite cross bar 4 and pass through the bar 6, and similar rods 14 have their ends anchored in the brackets 10 and their middle portions in crossed relation passing through holes in the upright plate 15 that is secured to the vertical flange of the cross bar 6, directly above the pipe section. A similar plate 15' is secured to one angle bar 16 on the under side of the pipe section and a truss rod 17 passes through the plate 15' and has its ends anchored in angle plates 18 that are secured to the pipe section adjacent the cross bars 4. This arrangement of rods forms a truss construction so that the cross bars 4 may be arranged a considerable distance apart and still the pipe section will not sag between them or drag upon the ground. The truss frame is comparatively stiff and capable of supporting a considerable load, and will withstand any ordinary strain to which the sprinkling unit may be subjected. The ends of the cross bars 4 have bearings therein for studs 19 mounted on the caster wheels 20, which are adapted to turn on a vertical pivot and adjust themselves in varying positions and allow the section unit to be pulled or dragged anywhere on the fairway. Rods 21 are mounted on the cross bars extending about and parallel therewith and draft rings 22 are loosely mounted on these rods and free to slide back and forth thereon from one end to the other, and form a convenient means for connecting the draft device thereto, the caster wheels assuming any desired angle to follow the direction of pull of the tractor, or other means that may be provided for moving the apparatus. Each pipe section is provided, preferably, adjacent its ends with couplings 23 for the upright standards 24 of a sprinkling head 25 of the type adapted to revolve under pressure of the water and throw the stream a considerable distance on each side of the apparatus. This sprinkling head is of a standard type in common use and no claim to its construction is made herein except in combination with this particular type of support. The average fairway is from fifty to fifty-five yards in width, or about one hundred and fifty feet. There are two units to each section of the sprinkling apparatus with a flexible connection such as the hose 26 between the adjacent ends of the pipe sections. Each unit is preferably about fifty feet in length and when the two units are in alignment they will cover a width of fairway of about 100 feet. The end sprinkling heads are capable of throwing water over a radius of about 25 feet and hence will cover an area of fairway at each end of the apparatus about 25 feet in width stretching beyond the ends of the apparatus. Hence an equipment of this kind will sprinkle the full width of the ordinary fairways very nicely, and when one width is thoroughly sprinkled a suitable power apparatus can be attached to the units and the whole device moved on the caster wheels sufficiently to allow the sprinklers to reach a new unwatered area of the fairway and this operation is continued until the full length of the fairway, or as much thereof as it is desired to sprinkle, has been thoroughly covered.

The dimensions of the units may, of course, be varied and the construction may be modified, the general idea being to provide a light but strong and durable frame in which sprinkler heads may be mounted and the fairways watered the full width, so that all portions of the course where a golf ball should be lying will have a suitable springy turf that will enable the player to make any shot or use any club that he may desire.

I claim as my invention:

1. A sprinkling apparatus comprising a unit having an elongated pipe section provided with means for connection with a water supply, cross bars mounted on and connected to said section, truss rods connecting said cross bars and bracing and supporting said section, caster wheels mounted on certain of said cross bars, means for attaching a motive power to said cross bars for moving said unit from place to place, and sprinkler heads mounted on said pipe section at intervals.

2. A sprinkling apparatus comprising a unit having an elongated centrally arranged pipe section provided with means for connection with a water supply, cross bars mounted at intervals on said section, a supporting means for said section mounted on said crossbars, truss rods connected to the ends of said section and passing through said cross bars and similar rods connected to said bars and extending above and below said section and having their middle portions supported thereon and sprinkler heads mounted at intervals on said units.

3. A sprinkling apparatus comprising a unit having an elongated pipe section provided with means for connection with a water supply, cross supports having casters swiveled thereon on which said apparatus is moved from place to place, means connecting with said cross supports for bracing said section laterally, terminally and centrally to resist buckling or bending thereof, and sprinkler heads mounted at intervals on said section.

4. A sprinkling apparatus comprising an elongated pipe section, cross bars attached to said pipe section intermediately thereof, truss rods connected terminally of the pipe and traversing said bars, and crossed truss rods connecting certain of the bars and intermediately supporting the pipe section at the upper side.

5. A sprinkling apparatus comprising an elongated pipe section, cross bars attached to said pipe section intermediately thereof, truss rods connected terminally of the pipe and traversing said bars, crossed truss rods connecting certain of the bars and intermediately supporting the pipe section at the upper side, and a truss rod supporting the intermediate portion of the pipe beneath and anchored in adjacent cross bars.

In witness whereof, I have hereunto set my hand this 15th day of October, 1923.

JOHN S. CLAPPER.